United States Patent
Kulbeth

(10) Patent No.: US 6,808,354 B1
(45) Date of Patent: Oct. 26, 2004

(54) TANK HAVING MULTIPLE SCREW-TYPE TRANSFER AUGERS

(75) Inventor: Robert M. Kulbeth, Carencro, LA (US)

(73) Assignee: Del Corporation, Scott, LA (US)

(*) Notice: Subject to any disclaimer, the term of this patent is extended or adjusted under 35 U.S.C. 154(b) by 0 days.

(21) Appl. No.: 10/417,451

(22) Filed: Apr. 16, 2003

(51) Int. Cl.$^7$ .............................................. B65G 65/00
(52) U.S. Cl. ................. 414/326; 414/325; 198/550.1; 198/663
(58) Field of Search ................. 414/502, 503, 414/505, 523, 526, 310, 312, 325, 326; 198/550.1, 657, 663, 674

(56) References Cited

U.S. PATENT DOCUMENTS

| | | | |
|---|---|---|---|
| 2,443,942 A | * | 6/1948 | Winkler et al. .......... 198/550.1 |
| 3,707,246 A | * | 12/1972 | Ewell .......................... 222/134 |
| 4,804,111 A | * | 2/1989 | Ricciardi et al. ............. 222/77 |
| 5,183,147 A | * | 2/1993 | Callahan et al. ............ 198/524 |
| 5,468,113 A | * | 11/1995 | Davis .......................... 414/523 |
| 5,658,116 A | * | 8/1997 | Krull ........................... 414/326 |
| 5,662,807 A | | 9/1997 | Angelle |
| 5,846,440 A | | 12/1998 | Angelle |
| 5,871,619 A | * | 2/1999 | Finley et al. ................ 202/262 |
| 5,941,464 A | * | 8/1999 | Seymour ..................... 239/675 |
| 6,017,182 A | * | 1/2000 | Grieshop .................... 414/526 |
| 6,050,456 A | * | 4/2000 | Soper et al. ................. 222/272 |
| 6,096,228 A | | 8/2000 | Angelle |
| 6,357,577 B1 | * | 3/2002 | Bruke .......................... 198/625 |
| 6,561,342 B2 | * | 5/2003 | Lepage ..................... 198/550.1 |

* cited by examiner

*Primary Examiner*—Khoi H. Tran
(74) *Attorney, Agent, or Firm*—Domingue & Waddell, PLC

(57) ABSTRACT

A multi-screw auger equipped tank comprises opposing sides sloping downward and inwardly toward one another. A plurality of shaftless screw transfer augers run along the tank bottom. Drivers and transmissions coupled to the transfer augers permit simultaneous rotation of the augers in the same or opposite directions of rotation, at the same or different rotational speeds. Materials within the tank, typically slurries or sludges, can be moved to one end of the tank by the transfer augers. An inclined screw auger is disposed near the end of the tank distal from the location at which materials are deposited in the tank. The inclined screw auger picks up the materials and moves them out of the tank. Baffles in the tank aid in dewatering slurries and sludges. Circulation of materials within the tank may be done by rotating the transfer augers in different directions and/or rotational speeds.

22 Claims, 4 Drawing Sheets

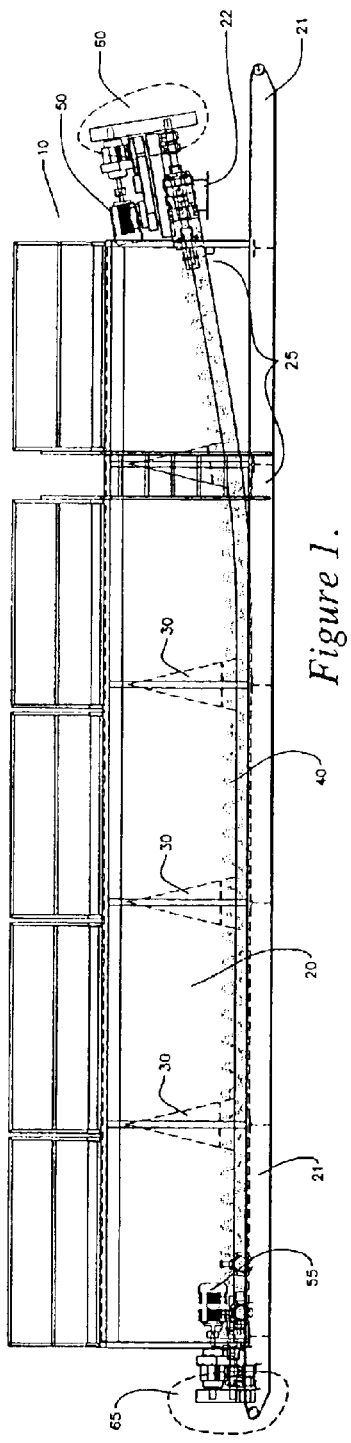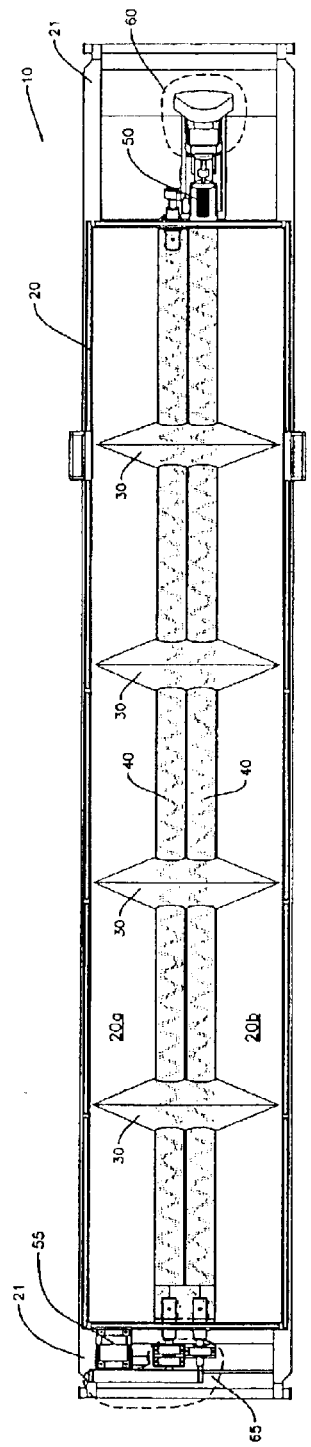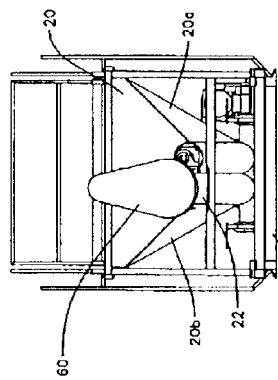

TANK HAVING MULTIPLE SCREW-TYPE TRANSFER AUGERS

BACKGROUND

1. Field of Art

This invention relates to tanks typically used for at least temporary storage and/or processing of solids, liquids, and solid/liquid slurries and sludges of varying degrees of fluidity (from relatively dry to relatively wet), often comprising wellbore drill cuttings, process waste, or other solids. With further specificity, this invention relates to such tanks comprising screw-type augers within the tank, to enable moving materials therein.

2. Related Art

Tanks having different sizes, cross sectional shapes, and internal baffles or partitions have been used for the collection, holding, and transfer of solid and liquid materials, and mixtures thereof, for many years. These mixtures form slurries and sludges of varying degrees of fluidity. More recently, tanks having some means for moving the material around inside of the tank have been used. One such means is a spiral, screw-type auger, mounted in the tank. Rotation of the auger moves materials within the tank, generally along the axis of the auger, under mechanical principles known in the art.

A typical arrangement of internal auger equipped tanks has been a tank having opposing, inclined walls which slope toward a central point at the bottom of the tank, forming in effect a trough extending at least part of the length of the tank. A single screw type auger is disposed at or near the valley of the trough. Prior art screw augers in typical use in this application have comprised a central longitudinal auger shaft, with the continuous spiral blade of the auger effectively wrapping around the auger shaft. So-called shafted augers are relatively heavy, prone to clogging, and are relatively inflexible (that is, are relatively longitudinally rigid).

The prior art tanks having screw augers therein exhibit several limitations:

I. single augers are relatively inefficient at moving materials within the tank, as only a limited portion of the cross-sectional area of the tank can be encompassed by the auger;

II. a single auger can move the materials effectively only along the axis of the auger, with relatively little ability to effectively circulate tank contents;

III. shafted screw augers are more likely to clog with the common relatively wet and sticky slurries which such tanks contain, and are not as efficient at moving solids/liquids;

IV. shafted screw augers are relatively longitudinally stiff, and cannot readily conform to tanks not having a flat bottom; and V. tanks with shafted screw augers exhibit a higher profile in comparison with shaftless screw augers, for a given effective cross sectional area.

In addition, the single speed drive systems of prior art screw auger-equipped tanks are relatively inflexible to accommodate differing environments, particularly different qualities in the solids, liquids, slurries, sludges, etc. that such tanks commonly hold. Prior art drive systems commonly permit rotation of the screw auger in only one rotational direction.

SUMMARY OF THE INVENTION

The present invention comprises a tank having multiple screw-type augers therein. In the presently preferred embodiment, the invention comprises a tank having opposing sides sloping inwardly toward each other from top to bottom, forming a generally V-shaped transverse cross section, typically with the apex at the bottom of the "V" being truncated. A plurality of shaftless screw transfer augers run along the bottom of the tank. A driver/transmission coupled to each transfer auger permits them to be operated in the same or opposite directions of rotation, and at the same or different rotational speeds, simultaneously. Materials within the tank, which may be solids, liquids, or slurries or sludges containing both, can be moved to either end of the tank by the transfer augers. An inclined lift auger, with a variable speed and rotational direction drive system, can then pick up the materials and move them out of the tank, into another tank or a desired deposit spot. Transverse baffles in the tank aid in dewatering slurries and sludges, as the slurries and sludges pass through openings in the baffles, pushed by the transfer augers. Circulation of the materials within the tank may be carried out by rotating the transfer augers in opposite directions and/or different rotational speeds.

BRIEF DESCRIPTION OF THE DRAWINGS

FIG. 1 is a side view of one embodiment of the multiple auger-equipped tank of the present invention.

FIG. 2 is a top view of one embodiment of the invention.

FIG. 3 is an end view.

DESCRIPTION OF THE PRESENTLY PREFERRED EMBODIMENT

Figure 4:
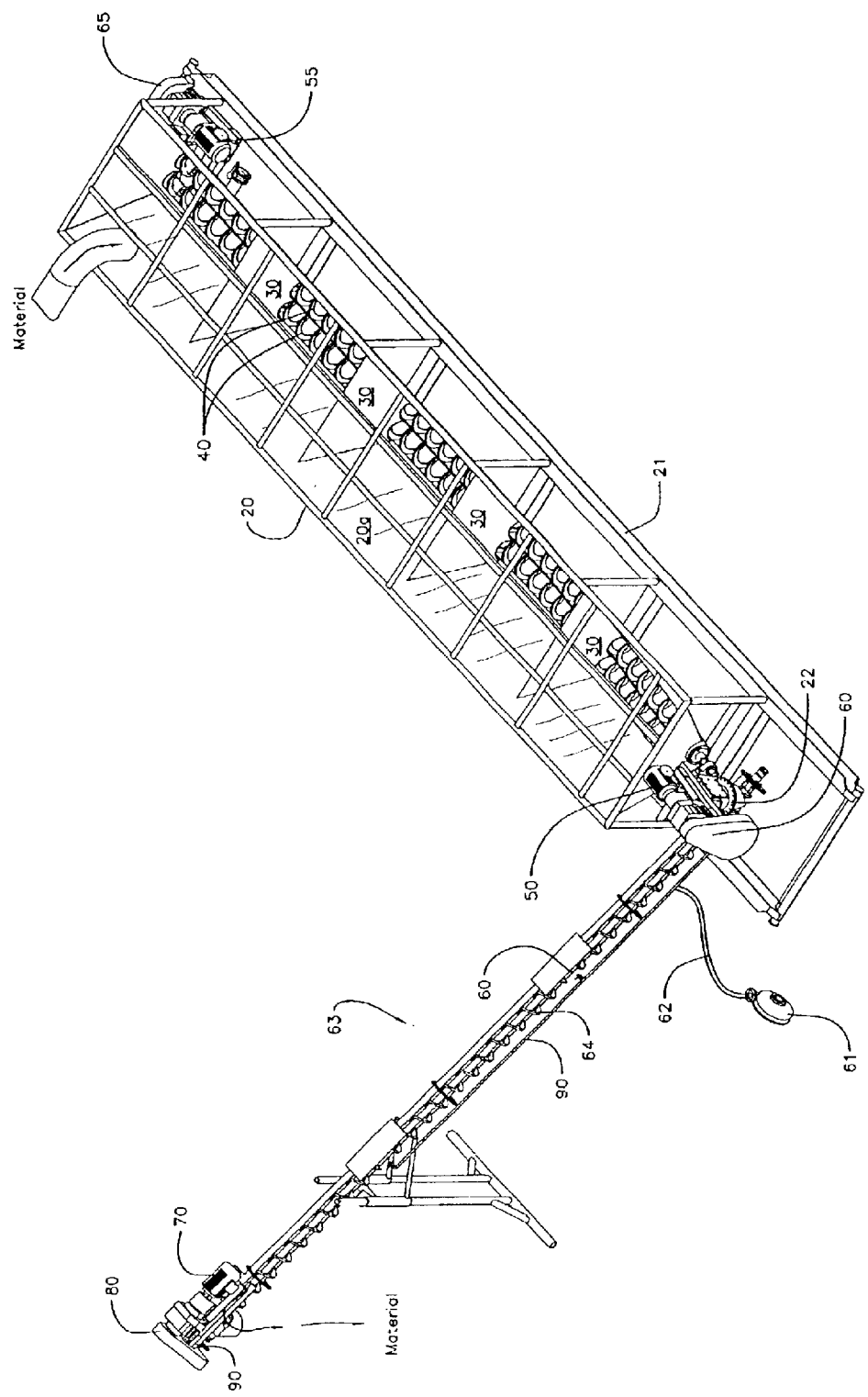
FIG. 4 is a perspective view of one embodiment of the invention.

While those having ordinary skill in the relevant art field will recognize that changes may be made to the preferred embodiments disclosed in this application, without deviating from the spirit of the invention, with reference to the drawings some of the presently preferred embodiments will be described.

As shown in FIG. 1, the multiple screw auger tank 10 comprises a generally horizontally elongated tank 20 having opposing sides 20a and 20b, sloping inwardly toward one another from top to bottom. Tank 20, in the presently preferred embodiments, forms generally a V-shape in transverse cross section, with the bottom apex of the "V" somewhat truncated.

As can be seen particularly in FIGS. 1–3, tank 20 comprises at least one, and preferably two or more, transverse baffles 30, spanning from one side of tank 20 to the other side. In one presently preferred embodiment, baffles 30 extend substantially to the bottom of tank 20, with openings in baffles 30 through which two or more screw-type transfer augers 40 are disposed, described in more detail later. Preferably, baffles 30 themselves comprise sloping walls that have an apex at the top of the baffle, then slope outwardly toward the bottom of the baffle, as can be seen in FIGS. 1 and 2. The sloping walls tend to ease solids movement up and down along the face of the wall, and ease cleanup of the baffles if needed.

At least two screw augers, shown as transfer augers 40, are disposed proximal the bottom of tank 20, and in the preferred embodiment run substantially parallel to one another and substantially parallel to the longitudinal axis of tank 20. While the scope of the present invention encompasses any type of screw auger, in a presently preferred embodiment, transfer augers 40 comprise shaftless screw augers. Shaftless screw augers are less prone to clogging, and therefore are more efficient at moving solids, slurries, and sludges of different degrees of fluidity, and further are sufficiently flexible to accommodate relatively shallow angle changes or "bends" in the screw augers, along their length, as can be readily seen in FIG. 1. In the embodiment shown in FIG. 1, one end of tank 20 has an upwardly sloping bottom section 25, on which transfer augers 40 run, leading up to outlet 22. Transfer augers 40 bend to conform to sloping bottom section 25. Outlet 22 may be flanged, for connection to piping, etc., in order to permit routing of materials in tank 20 to a desired location; or outlet 22 may simply permit materials to be dumped into another tank positioned below tank 20. For example, outlet 22 may be joined to lift auger system 63, as can be seen especially in FIG. 4 and further described below. The flexibility of shaftless augers facilitates a novel aspect of the present invention, particularly the embodiment shown in FIG. 1. For many applications, it is necessary to connect some sort of piping or other equipment to outlet 22 in order to route materials out of tank 20. It can be readily appreciated that such connections require some amount of clearance beneath outlet 22, to enable an elbow, flanged connections, etc. to be connected. The sloping bottom section 25 permits raising outlet 22 a sufficient distance above the surface on which tank 20 is resting, to carry out such connections. The shaftless transfer augers of one presently embodiment cooperatively enable such configuration, while still yielding an overall lower profile installation; as can be seen in FIG. 1, save for sloping bottom section 25, the balance of transfer augers 40, and consequently the bottom of tank 20, are relatively low. This arrangement permits an overall lower profile arrangement of the various components of the invention, as may be seen by comparison of the embodiment of FIG. 1 (with an sloping bottom section) with the embodiment of FIG. 5 (described below). Such lower profile is frequently an advantage in the limited space available on offshore structures.

Sloping bottom section 25 also aids in dewatering slurries and sludges, as liquids tend to run down the slope; therefore, the materials which are moved up the sloping bottom section and routed through outlet 22 are generally drier.

Tracking of transfer augers 40 is provided at least in part by their passage through the openings in baffles 30, the openings providing a relatively close fit about transfer augers 40.

Tank 20 is preferably mounted on a skid 21, for ease in moving the tank to work locations, etc. It is within the scope of this invention to have the tank 20 trailer mounted.

A means for rotating the transfer augers 40 is provided, which enables rotation of each transfer auger 40 independently as to both rotational speed and direction. Said another way, the means for rotating the transfer augers permits rotation of the transfer augers at the same or different rotational speeds, and at the same or different rotational directions, simultaneously. In a presently preferred embodiment, the means for rotating transfer augers 40 comprises a first driver 50, seen in FIGS. 1 and 2 as well as the other figures, coupled to one of transfer augers 40 by appropriate first transmission means 60, such as gearing, belts, or other means well known in the art. In the embodiment shown in FIGS. 1 and 2, first driver 50 is an electric motor. However, it is understood that first driver 50 could be a hydraulic motor, internal combustion engine, or other driver known in the art. Additionally, as shown in FIGS. 1 and 2, the invention may comprise a second driver 55 and second transmission means 65, mounted at the end of transfer augers 40 distal from first driver 50, to turn another of transfer augers 40. It is understood, however, that the scope of the present invention comprises driver and transmission means arrangements with both drivers and transmission means mounted at one end of transfer augers 40; and encompasses embodiments in which a single driver is coupled to both transfer augers by appropriate transmission means, permitting independent rotation (both as to direction and speed) of both transfer augers by a single driver.

FIG. 3 is a view from one end of tank 20, showing especially the sloping tank sides 20i a and 20i b, skid 21, and first transmission means 60.

A presently preferred embodiment of the invention as shown in FIG. 4 further comprises a lift auger system 63, typically disposed near one end of tank 20. Lift auger system 63 comprises a screw type lift auger 64 disposed within a shaft 90, to move materials (for example, solids and slurries and sludges of different degrees of fluidity) out of tank 20 and into another tank for disposition, or simply to move the solids and sludges to a desired deposit area. Lift auger 64 is preferably inclined so as to lift the solids out of tank 20. While either shafted or shaftless augers could be used, lift auger 64 is preferably a shafted screw auger, in order to prevent failback of fluid materials. In addition, a shafted auger can generally be turned at higher rotational speeds than a shaftless auger, due to its longitudinal rigidity, and for purposes of the lift auger the higher speed can be advantageous. A driver 70 is coupled to lift auger 64 via a transmission means 80, and thereby rotates lift auger 64. Driver 70 may be an electric motor, as shown in FIG. 4, or a hydraulic motor, internal combustion engine, or other driver known in the art. Transmission means 80 may comprise gearing, pulleys and belts, or other transmission means well known in the art. Driver 70 and transmission means 80 enable rotation of lift auger 64 at a desired rotational speed and direction, as dictated by actual operating conditions. Preferably, a flushing system, comprising pump 61 coupled to shaft 90 via hose 62, is provided to supply a flow of water to flush out shaft 90 if needed.

Figure 5:
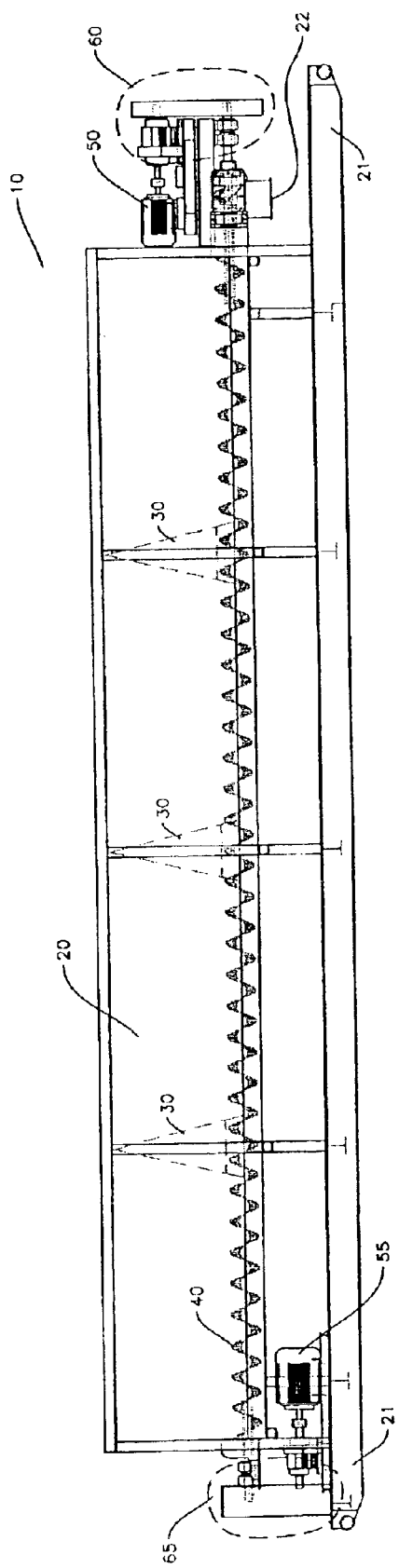
FIG. 5 is a side view of another embodiment of the invention.

Another embodiment of the invention is shown in FIG. 5. This embodiment comprises a tank 20 having a substantially flat bottom surface along its entire length, i.e. without the sloping bottom section 25 of the embodiment seen in FIG. 1. In this embodiment, transfer augers 40 simply conform to the flat bottom of tank 20. This embodiment may also comprise second driver 55 and transmission means 65, as described above.

Figure 6:
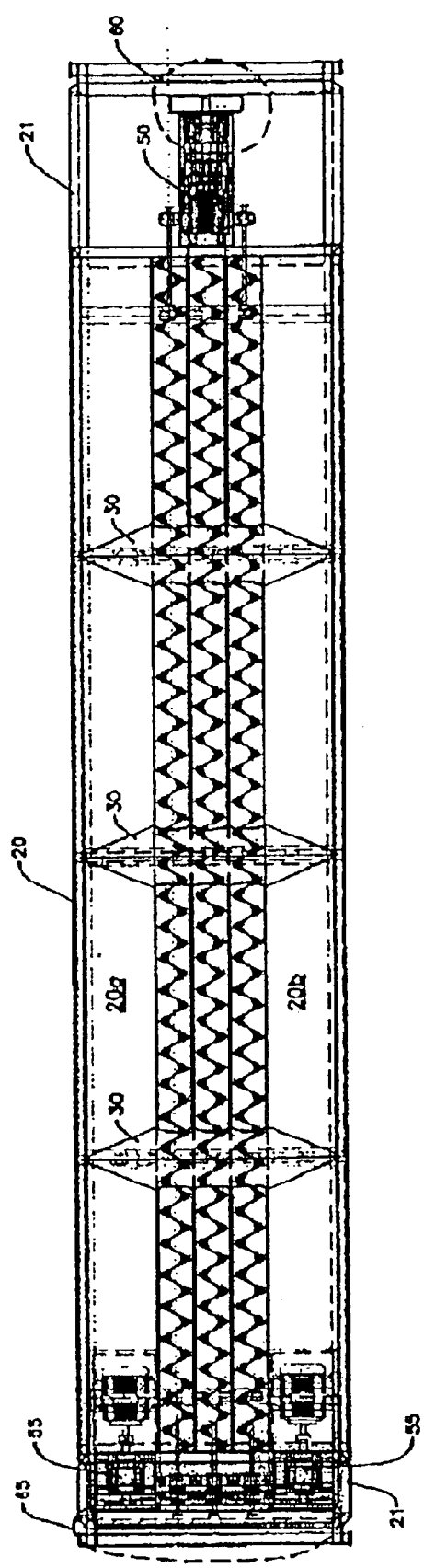
FIG. 6 is a top view of another embodiment.

Still another embodiment is shown in FIG. 6. As can be readily seen, in this embodiment the two or more transfer augers comprises three transfer augers 40. The additional number of screw transfer augers permits increased options for transfer and/or circulation of tank materials. It is understood that the scope of the present invention comprises any plurality of transfer augers, and the two embodiments shown (with two and three transfer augers, respectively) are by way of example only. As with the previously described embodiments, multiple drivers and transmission means (reflected in FIG. 6 as driver 55 and transmission means 65) may be employed to turn the multiple augers.

With regard to materials for the various components of the invention, the presently preferred embodiments contemplate sheet metal as a suitable material for the tank, with the thickness, grade, etc. dependent upon the size of the tank, expected materials, etc., as is well known in the art. Metals are also contemplated as suitable materials for forming the augers.

Use of the Multiple Transfer Auger Tank

A typical use of the invention will now be described, with reference to the drawings, especially FIG. 4. A quantity of material is introduced into tank 20, typically near the end of tank 20 distal from lift auger system 63. While the invention can handle dry materials, such as dry, granular dirt, sand, etc., typically the material contains at least some entrained liquid, forming a slurry or sludge type mixture. While not an exclusive application for use of the invention, a typical, exemplary use is in connection with cuttings generated from the drilling of earthen boreholes, for oil and gas wells. A volume of drill cuttings (typically coming off of a "shale shaker," which screens out the cuttings from the drilling fluid stream) is routed to tank 20, typically near one end. For example, tank 20 can be situated so that cuttings from the shale shaker simply fall into tank 20. Drivers 50 and 55 are operated so as to rotate transfer augers 40 at a desired rotational speed, and in a desired rotational direction. It can be readily appreciated that rotation of transfer augers 40 in one direction will tend to move the materials toward lift auger system 63, by forcing the materials through the openings in baffles 30, through which transfer augers 40 pass. Conversely, rotation of the transfer augers in the opposite direction will tend to move the materials toward the end of the tank distal from the lift auger. Materials are moved through outlet 22, into shaft 90. Lift auger 64 is then operated at a suitable rotational speed to lift the materials from their entry into shaft 90, up shaft 90, and to the discharge from shaft 90 to a desired location, such as another tank. Yet another use is the blending of two or more materials to create a more homogeneous mixture. The blending capabilities permit the operator to add materials to slurries and sludges, in order to partially solidify such mixtures, which may be required in some applications. As previously described, rotation of transfer augers 40 in opposite directions is especially useful for mixing and blending functions.

While the invention is beneficially used for the handling and processing of drill cuttings, it is equally suitable for processing the output of centrifuges, filter presses, and other industrial equipment.

It can be readily appreciated that the slurries and/or sludges within the tank, by moving them through the baffles, are at least partially dewatered. A resulting benefit of the present invention, therefore, is a great reduction in the total weight of the material which must be subsequently transported (via truck, rail, boat, or other means), with a corresponding great reduction in transport and disposal costs.

Another mode of operation is the rotation of the transfer augers in opposite rotational directions from one another, simultaneously. This mode yields a circulation of the materials in the tank (as the materials are being moved in one direction by one transfer auger, and in the opposite direction by the other transfer auger), which is of significant advantage in materials handling. The ability to mix the materials can creates a more uniform mixture, permits blending different materials together, etc. Circulation may be enhanced also by differing rotational speeds, etc.

Persons having ordinary skill in the relevant art will recognize that various modifications may be made to the presently preferred embodiments set forth herein, without departing from the spirit of the invention. For example, sizes of the various elements—the tank, screw augers, etc., can be altered as needed. Different numbers of multiple transfer augers can be used, to accommodate differing materials and conditions. Rotational speeds and directions of the transfer augers can be adjusted. While most components of the invention are preferably constructed from metals, it is recognized that non-metal composites could be used for some components. The number and shape of the internal, transverse baffles can be varied. The drivers for the transfer augers and lift auger can be electric motors, hydraulic motors, internal combustion engines, or other rotary drive means known in the art. The pitch of the augers (that is, longitudinal distance required to make one complete revolution) can be altered to suit operating conditions.

Therefore, the scope of the invention should be measured not by the preferred embodiments set forth above, but by the scope of the appended claims and their legal equivalents.

I claim:

1. A tank having multiple screw transfer augers, comprising:
   a) a horizontally elongated tank comprising two sides sloping inwardly toward one another from top to bottom;
   b) at least one transverse baffle disposed in said tank and spanning from one side to the other side, wherein said at least one transverse baffle contains openings therein;
   c) at least two shaftless screw augers disposed in said tank, along and proximal to the bottom of said tank; and
   d) means for independently rotating each of said shaftless screw-type augers; and
   e) wherein said at least one transverse baffle extends to a bottom of said tank, and said screw augers are disposed through openings in said at least one transverse baffle.

2. The tank of claim 1, wherein said means for independently rotating each of said screw augers comprises a first driver and a first transmission means coupling said first driver to said screw augers.

3. The tank of claim 2, wherein said first driver comprises an electric motor.

4. The tank of claim 1, wherein said at least one transverse baffle comprises opposing walls forming an apex at the top of said baffle and sloping outwardly away from one another from the top to the bottom of said baffle.

5. The tank of claim 1, wherein a section of a bottom of said tank proximal one end is angled upwardly from horizontal, and wherein said screw augers bend to conform to said angled bottom.

6. The tank of claim 1, wherein said first driver and transmission means is disposed at one end of said screw augers, and wherein said means for independently rotating each of said screw augers at selected rotational speeds and directions further comprises a second driver and a second transmission means coupling said second driver to said screw augers, disposed at the other end of said transfer augers.

7. The tank of claim 1, wherein said said tank comprises a third screw auger.

8. The tank of claim 1, further comprising:
   e) an inclined screw lift auger disposed in a shaft, said lift auger disposed so as to accept materials in said tank moved to an inlet of said shaft by said screw augers; and
   f) means for selectively rotating said lift auger at desired speeds and directions.

9. The tank of claim 8, wherein said means for selectively rotating said lift auger comprises a driver and a transmission means coupling said driver to said lift auger.

10. The tank of claim 8, further comprising a flushing system comprising a fluid pump coupled to said shaft by a hose.

11. The tank of claim 9, wherein said driver comprises an electric motor.

12. A materials storage and handling tank, comprising:
   a) a tank comprising two sides sloping inwardly toward one another from top to bottom, said sides and a bottom of said tank forming a trough;
   b) at least two shaftless screw transfer augers disposed in said trough; and
   c) means for independently rotating each of said transfer augers at selected rotational speeds and directions; and,
   d) a baffle disposed in said tank and spanning from one side to the other side, said baffle comprising openings therein through which said transfer augers are positioned.

13. The tank of claim 12, wherein said means for independently rotating each of said transfer augers at selected rotational speeds and directions comprises a first driver and a first transmission means coupling said first driver to said transfer augers.

14. The tank of claim 13, wherein said first driver comprises an electric motor.

15. The tank of claim 14, wherein a section of a bottom of said tank proximal one end is angled upwardly from horizontal, and wherein said transfer augers bend to conform to said angled bottom.

16. The tank of claim 12, further comprising:
   d) an inclined screw-type lift auger disposed in a shaft, said lift auger disposed so as to accept materials in said tank moved to an inlet of said shaft by said transfer augers; and
   e) a driver and a transmission means coupling said driver to said lift auger, said driver and transmission means permitting rotation of said lift auger at variable rotational speeds and directions.

17. The tank of claim 16, wherein said lift auger is a shafted auger, and further comprising a fluid pump coupled to said shaft by a hose, for flushing of said shaft of clogging materials.

18. A method for handling materials in a tank, comprising the steps of:
   a) providing a tank system, comprising:
      i) a horizontally elongated tank comprising two sides sloping inwardly toward one another from top to bottom;
      ii) at least one transverse baffle disposed in said tank and extending to the bottom of said tank and spanning from one side to the other side and wherein said baffle contains openings;
      iii) at least two shaftless screw transfer augers disposed in said tank, along and proximal to the bottom of said tank and wherein said transfer augers are disposed through said baffle openings; and
      iv) means for independently rotating each of said transfer augers at selected rotational speeds and directions;
   b) placing a volume of material within said tank; and
   c) rotating said transfer augers so as to move said material through said baffle openings within said tank.

19. The method of claim 18, wherein said transfer augers are rotated in opposite directions, thereby effecting a mixing of said material within said tank.

20. The method of claim 18, wherein:
   said tank system further comprises a lift auger system coupled to said tank, said lift auger system comprising an inclined lift auger disposed in a shaft, a driver and a transmission means coupling said driver to said lift auger; and
   further comprising the steps of rotating said transfer augers so as to move materials Into said shaft, and rotating said lift auger so as to move materials through said shaft and discharge said materials into a desired location.

21. The method of claim 19, wherein:
   said tank system further comprises a lift auger system coupled to said tank, said lift auger system comprising an inclined lift auger disposed in a shaft, a driver and a transmission means coupling said driver to said lift auger; and further comprising the steps of rotating said transfer augers so as to move materials into said shaft, and rotating said lift auger so as to move materials through said shaft and discharge said materials into a desired location.

22. The method of claim 18 wherein a section of a bottom of said tank proximal one end is angled upwardly from horizontal, and wherein said transfer augers bend to conform to said angled bottom, and the method further comprises:
   discharging said material at a sufficient distance above the tank bottom.

* * * * *